United States Patent [19]

Rudeen et al.

[11] Patent Number: 5,622,374
[45] Date of Patent: Apr. 22, 1997

[54] CHILD CARRIER FOR A BICYCLE

[75] Inventors: Robert W. Rudeen; Thomas Schmidt, both of Eugene, Oreg.

[73] Assignee: Family Trends, Inc., Eugene, Oreg.

[21] Appl. No.: 432,214

[22] Filed: May 1, 1995

[51] Int. Cl.$^6$ ............................ B62J 1/06; B62J 9/00
[52] U.S. Cl. .................. 280/202; 224/415; 224/416; 224/434; 297/250.1; 297/256.15
[58] Field of Search .................. 280/202, 288.4, 280/33.993, 283, 32.7, 30; 297/1, 2, 129, 250.1, 256.15, 256.1; 224/415, 416, 418, 422, 425, 426, 427, 429, 430, 434, 485, 484

[56] References Cited

U.S. PATENT DOCUMENTS

| | | | |
|---|---|---|---|
| 1,030,844 | 6/1912 | Howell | 280/202 |
| 1,144,550 | 6/1915 | Kelly | 280/202 |
| 1,205,489 | 11/1916 | Stoll | 280/202 |
| 2,498,663 | 2/1950 | Easley | 280/202 |
| 3,743,321 | 7/1973 | Luschen et al. | 280/202 |
| 4,367,829 | 1/1983 | Kusz | 224/31 |
| 5,285,935 | 2/1994 | Hsueh | 224/32 A |
| 5,370,441 | 12/1994 | Chuang | 297/250.1 |
| 5,385,357 | 1/1995 | Trubiano | 280/33.993 |

FOREIGN PATENT DOCUMENTS

| | | | |
|---|---|---|---|
| 0135531 | 11/1949 | Australia | 280/202 |
| 0575902 | 8/1929 | France | 280/202 |
| 0584252 | 2/1995 | France | 280/202 |
| 0553350 | 2/1930 | Germany | 280/202 |
| 0261960 | 12/1926 | United Kingdom | 280/202 |

OTHER PUBLICATIONS

Brochure, Sunny Corporation, dated Jun. 6 1994, 3 pages.

*Primary Examiner*—Anne Marie Boehler
*Attorney, Agent, or Firm*—Klarquist Sparkman Campbell Leigh & Whinston, L.L.P.

[57] ABSTRACT

A carrier for mounting onto a bicycle that can be converted between a child carrier and a cargo carrier is disclosed. The carrier is provided with a seat panel, backrest, handle bars and footrests which may be adjusted relative to the backrest and seat panel so as to accommodate various sizes of children. Further, the carrier includes a convertible element that pivots between rear and forward positions to convert the carrier between child carrier and cargo carrier configurations, respectively. The convertible element nests within the backrest When the carrier is in its child carrier configuration. Also disclosed is a suspension element for mounting between the carrier and the bicycle to reduce road vibration and impacts.

13 Claims, 6 Drawing Sheets

CHILD CARRIER FOR A BICYCLE

BACKGROUND OF THE INVENTION

1. Field of the Invention

This invention pertains generally to bicycle mounted child carriers and more particularly pertains to child carriers that can be converted to cargo carriers.

2. Description of the Related Art

Carriers are commonly mounted to bicycles for the purpose of carrying children and cargo. Almost all bicycles, except those designed for racing, include threaded bosses, or eyelets, welded to the bicycle's frame for connecting to racks and carriers. Child carriers are a common addition to bicycles so that adults may convey small children with them when they ride.

One such child carrier is disclosed in Hsueh, U.S. Pat. No. 5,285,935 which shows a wire mesh carrier that may be converted between a child carrier and a cargo carrier by means of hinged footrests and leg guards. When the footrests are in a downward, depending position, leg openings are exposed so a child may sit in the carrier. The footrests may be pivoted upward to cover the leg openings, thereby providing a four-sided enclosure for carrying cargo. However, because the footrests/leg guards are used to cover the leg openings, the design disclosed in Hsueh is restricted in its configuration. For example, the leg guards and footrests of Hsueh do not provide for any adjustment for different size children nor do they provide sufficient protection to a child's legs from the spokes of the rear wheel of the bicycle or in the event of a crash.

Prior art child carriers include footrests that are fixed in position. To accommodate small children, the footrests must be relatively close to the seat. When larger children use such seats, they are cramped and their feet and legs are held higher than necessary, which also unnecessarily raises the center of mass of the children, making the bicycle more difficult to control.

Additionally, prior art carriers do not provide any means of shock absorption to cushion the child's ride. The adults driving the bicycle usually see road hazards and position themselves to lessen shocks and vibration. However, the child passenger is not able to see or comprehend the road hazards and as a result, gets bounced and jolted.

Accordingly, what is needed is a child carrier that can be converted into a cargo carrier but which provides sufficient protection to children's legs and feet and adjustability of the footrest to accommodate children of different sizes. Also, a means of mounting the carrier to reduce shocks and impacts is needed to provide a more comfortable ride for the child.

SUMMARY OF THE INVENTION

The present invention provides a carrier that can be mounted onto a bicycle and converted easily between a child carrier and a cargo carrier, and provide adjustable footrests and a leg guard for adequate adjustment and protection for the legs of children of different sizes. The carrier of the present invention has a preferred embodiment which includes a frame mounted to a bicycle and a carrier unit having a backrest, leg units, front panel, and a convertible element.

The carrier unit is attached to the frame, preferably on a shock-absorption element. The backrest is located towards a rear portion of the frame and includes sides which extend forward from a rear panel of the backrest. The side panels terminate approximately half way between the rear panel and the front panel thereby creating leg openings between the side panels and the front panel.

Securely attached leg units depend from the carrier unit and include a leg guard and a footrest on each leg unit. The footrest connects to the leg unit at any of a plurality of positions thereby providing substantial adjustment in the height of the footrest to accommodate children of different sizes. Additionally, the footrest is a cage-like structure having a width approximately equal to or greater than the width of a child's foot and further including toe and heel abutments to securely retain a child's foot within the footrest and to provide protection to a child's foot and leg in the event the bicycle crashes or falls over. Also, the leg units are securely mounted, allowing a child to mount the carrier stirrup style, i.e., place one foot in a footrest and pull up, swinging the other foot over the carrier.

As noted, the preferred embodiment includes a convertible element. The convertible element is pivotally attached to the carrier and can pivot between a forward position and a rear position. In the rear position, the convertible element is nested within the backrest, and the leg openings between the side panels of the backrest and the front panel are exposed allowing children to be seated in the carrier and extend their legs through the leg openings. The convertible element may be pivoted to its forward position whereby side panels on the convertible element block the leg openings thereby converting the carrier into a cargo carrier having a base and four sides. No tools are necessary to change the configuration of the carrier from a child to a cargo carrier nor are any clasps, fasteners, or other devices required to maintain the convertible element in either of its two positions.

The preferred embodiment further includes a shock-absorption element between the carrier unit and its frame. Preferred shock-absorption elements include leaf springs, helical springs, and three-dimensional fabric such as foam rubber.

A preferred embodiment of the present invention further includes a handle bar with grips attached to the front panel for the child to hang onto during transportation. A storage area is provided on the handlebars to hold a water bottle or juice box. A lanyard is connected to the storage area and the bottle or box to prevent it from falling out. The preferred embodiment further includes a cushion mounted to the convertible element for providing greater comfort to the child. Further, the preferred embodiment may include a seat belt for securely restraining the child in the child carrier.

Various advantages and features of novelty which characterize the invention are particularized in the claims forming a part hereof. However, for a better understanding of the invention and its advantages, reference should be made to the drawings and to the accompanying description in which are illustrated and described preferred embodiments of the invention.

DETAILED DESCRIPTION OF THE PREFERRED EMBODIMENTS

Figure 2:
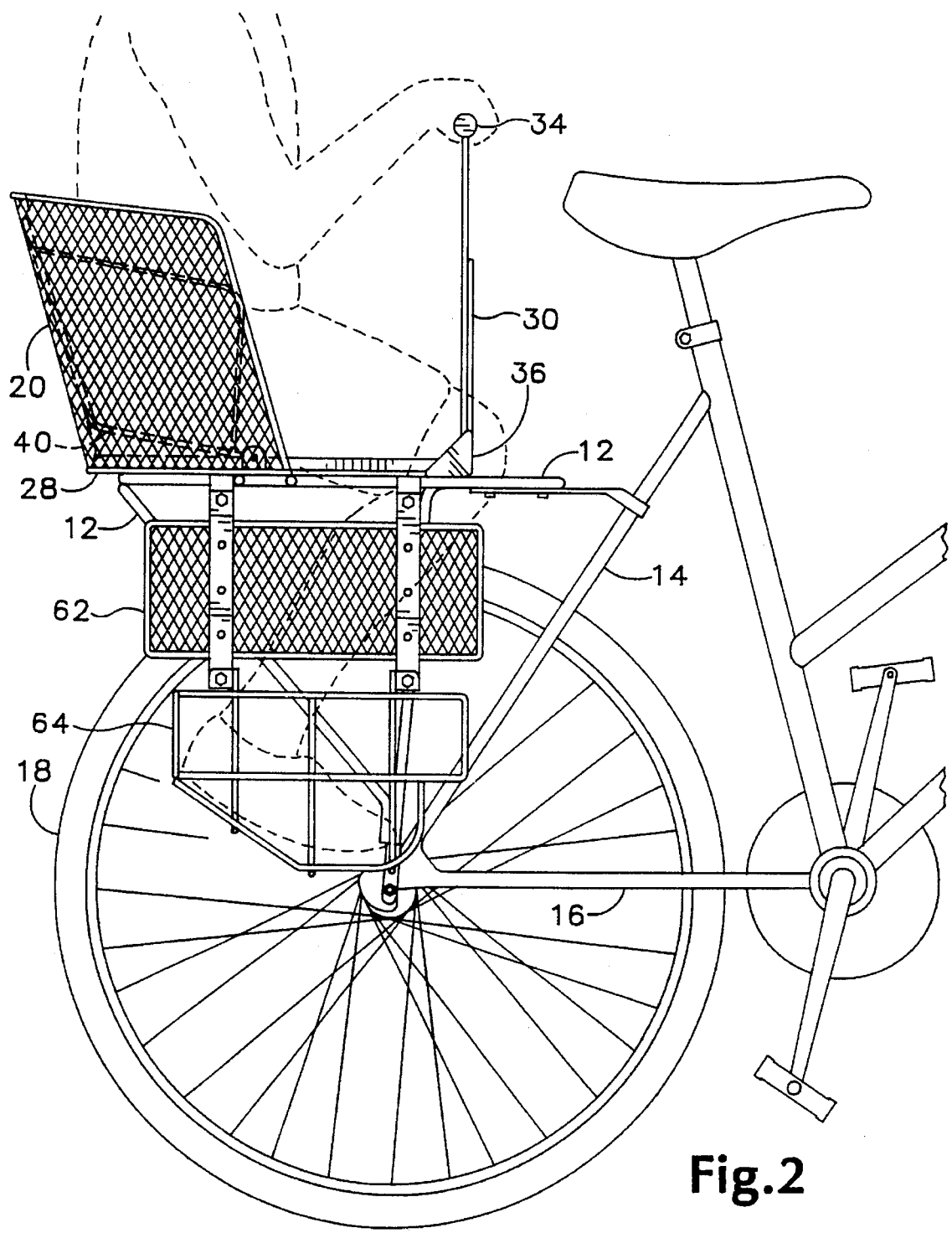
FIG. 2 is a side elevational view showing the carrier of FIG. 1 mounted onto the rear portion of a bicycle and showing a child seated in the carrier.

A preferred embodiment of the present invention is shown in the accompanying figures and designated generally as carrier 10. The carrier connects to a frame or rack 12, which can be mounted on the rear end of a bicycle by connection to threaded bosses (not shown) on seat stays 14 and chain stays 16. When the carrier and frame are attached to a bicycle in the preferred manner, the carrier 10 is located over a rear wheel 18 in a straddling fashion, as generally shown in FIG. 2.

The carrier 10 includes a backrest 20 having a rear panel 22 and side panels 24 and 26 which are all securely connected to a bottom panel 28. Preferably, the backrest 20 consists of a steel mesh coated with a polymer and the bottom panel 28 is a steel sheet. The bottom panel may be provided with bolt connections for secure attachment to the frame 12 or shock-absorption elements described below. The connections may be adjustable to allow the bottom panel 28 to be adjusted forward and backward relative to the frame 12 to permit optimal positioning of the carrier 10 to accommodate different sizes and weights of children. Ideally, the center of mass of a child passenger will be vertically over a hub of the rear wheel.

Also attached to the bottom panel 28 is a front panel 30 which is preferably a polymer-coated steel mesh. Front panel 30 further includes a handle bar 32 providing hand grips 34 for a child to grip while riding in the carrier. The front panel 30 and the backrest 20 may be attached to the bottom panel 28 by various means such as welding or mechanical fasteners. In the preferred embodiment, the backrest 20 and front panel 30 are welded to the bottom panel 28 and the front panel 30 further includes gussets 36 for strengthening its connection to the bottom panel.

The carrier 10 also includes a convertible element 40 that is pivotally attached to the bottom panel 28. The convertible element 40 includes a configured bar 42 that supports side elements 44 and extends between opposed lateral sides of the bottom panel 28. In the preferred embodiment, the bar 42 of the convertible element includes outwardly turned fingers 46 that pivotally engage holders 48 secured to bottom panel 28, but other hinge mechanisms could be employed. Further, the preferred embodiment includes a cushion 50 that is hingedly attached to a portion of the configured bar 42 of the convertible element 40.

Figure 1:
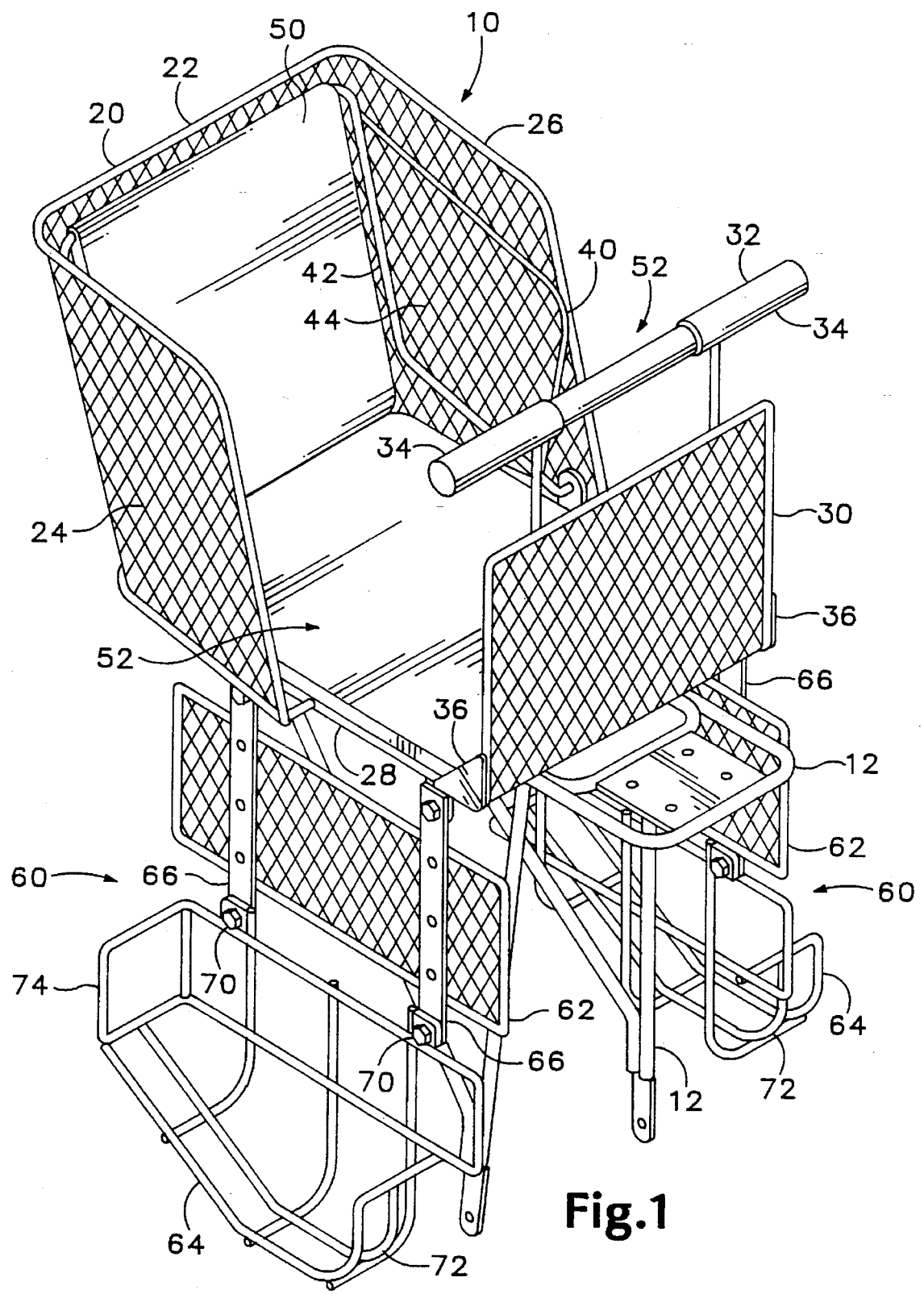
FIG. 1 is a perspective view of a preferred embodiment of the present invention of a bicycle mounted child carrier that may be converted into a cargo carrier.
Figure 3:
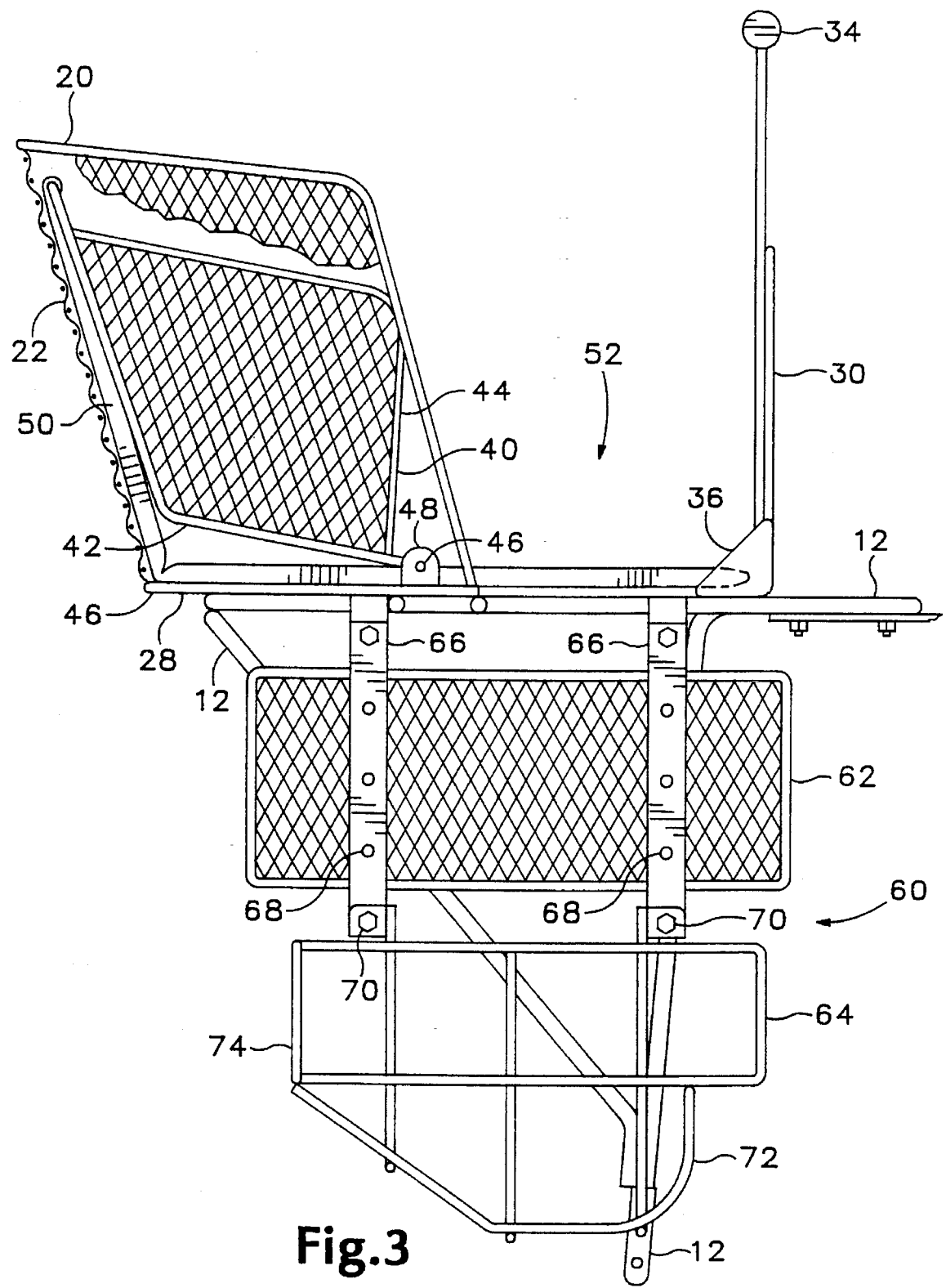
FIG. 3 is a side elevational view of the carrier of FIG. 1 which has been partially cut away to show details of the convertible element.
Figure 5:
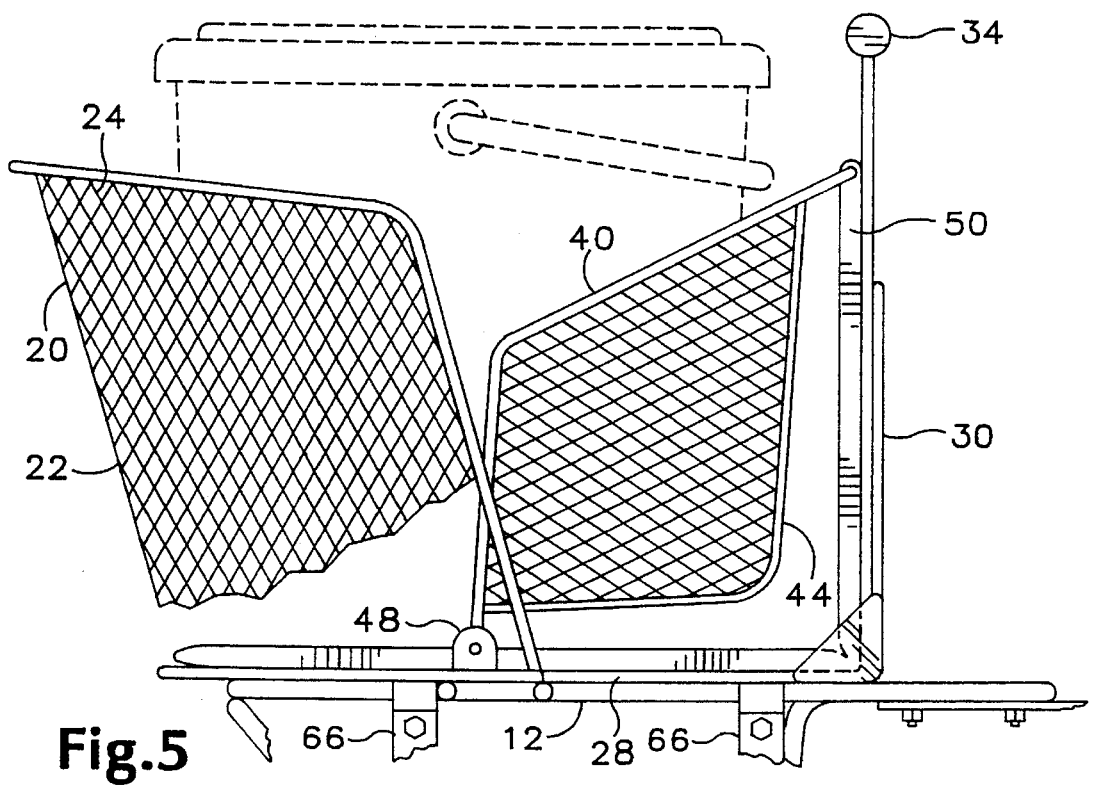
FIG. 5 is a partial side elevational view showing the convertible element in a forward position thereby converting the carrier into a cargo carrier.

The convertible element 40 may be pivoted between a rear position as shown in FIGS. 1–3 and a forward position as shown in FIG. 5. In the rear position the convertible element 40 nests within the backrest 20 such that the sides 44 of the convertible element are adjacent the side panels 24, 26. In this configuration, the carrier 10 defines leg openings 52 in a region of space between the side panels 24, 26 and the front panel 30. In this rear position, the cushion 50 depends from the convertible element 40 and rides along the back panel 22 and the bottom panel 28 providing a cushion for a child riding in the carrier 10.

Figure 4:
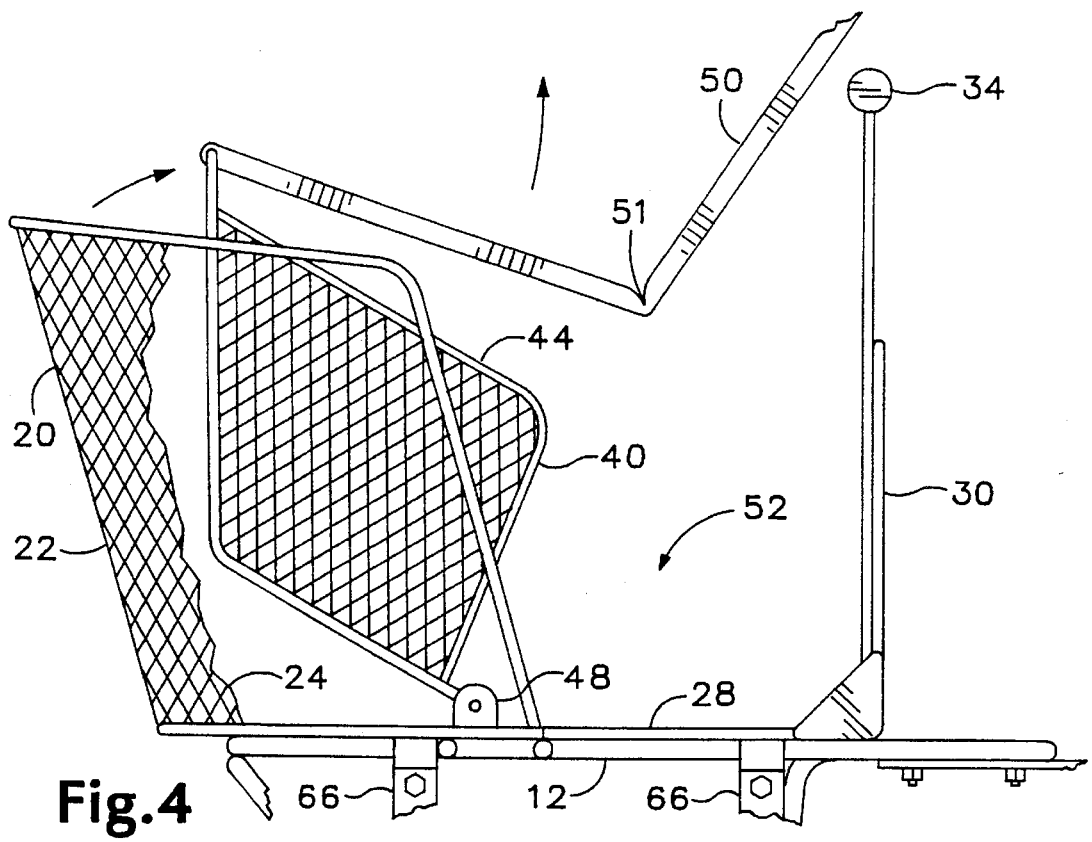
FIG. 4 is a partial side elevational view showing the convertible element partially pivoted between a rear position and a forward position.

The convertible element can be pivoted into its forward position by lifting the cushion 50 and manually pivoting the convertible element 40 about its fingers 46 engaged in holders 48, as is shown in FIG. 4. The cushion folds back on itself at a hinge line 51 to accommodate the forward position of the convertible element such that the cushion extends vertically along the front panel 30 and horizontally across the bottom panel 28 as depicted in FIG. 5. The sides 44 of the convertible element are new in the space that previously defined the leg openings 52 thereby converting the child carrier into a cargo carrier having four sides and a bottom. The four sides include the front panel 30, the sides 44 of the convertible element 40, and the backrest 20, which includes rear panel 22 and side panels 24, 26. Gravity keeps the convertible element 40 in both its forward and rear positions. In addition, the cushion 50 prevents the convertible element from bouncing when the bicycle is in motion by virtue of its connection to the convertible element 40 and friction with the rear panel 22 or front panel 30.

Figure 6:
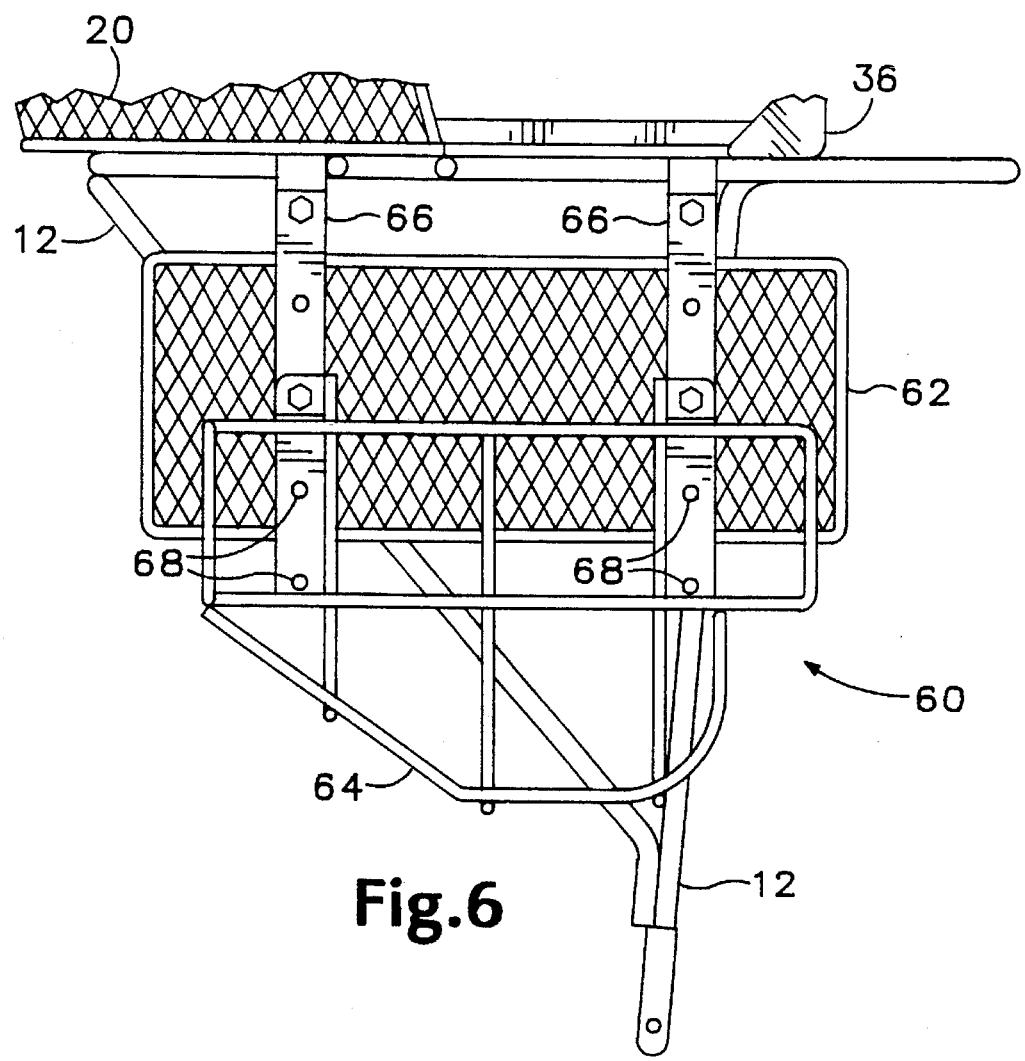
FIG. 6 is a partial side elevational view showing detail of one leg element of the carrier of the preferred embodiment.
Figure 7:
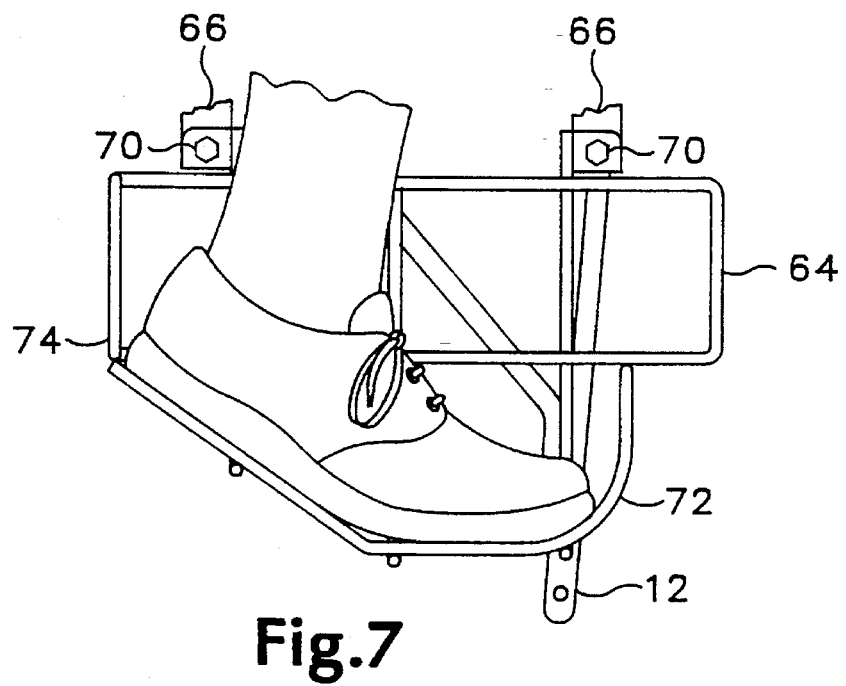
FIG. 7 is a partial side elevational view showing detail of a preferred embodiment of a footrest of the present invention shown with a leg and foot positioned therein.

The carrier 10 also includes leg units generally designated as 60. Preferably, the leg units include leg guards 62, footrests 64 and hanger bars or footrest supports 66, which define a plurality of openings 68. The leg guards 62 and hangers 66 may be fixedly connected to the bottom panel 28. The footrests 64 are adjustably connected to the hangers 66 by threaded fasteners 70 which may be selectively connected to the openings 68 located in the hangers 66. This adjustable feature allows the carrier 10 to be used with children of different sizes. In FIGS. 1 and 3, the footrest 64 is shown mounted at the lowest position, and in FIG. 6 the footrest is shown approximately midway between the top and bottom of the hanger 66.

The footrest 64 is preferably fabricated of configured bar stock and is provided with sufficient width to protect the foot and lower legs of children in the event the bicycle falls over or crashes. Further, the footrest 64 is provided with a toe abutment 72 and a heel abutment 74 which further serve to contain a child's foot within the footrest 64 during riding and in the event of a crash.

Figure 8:
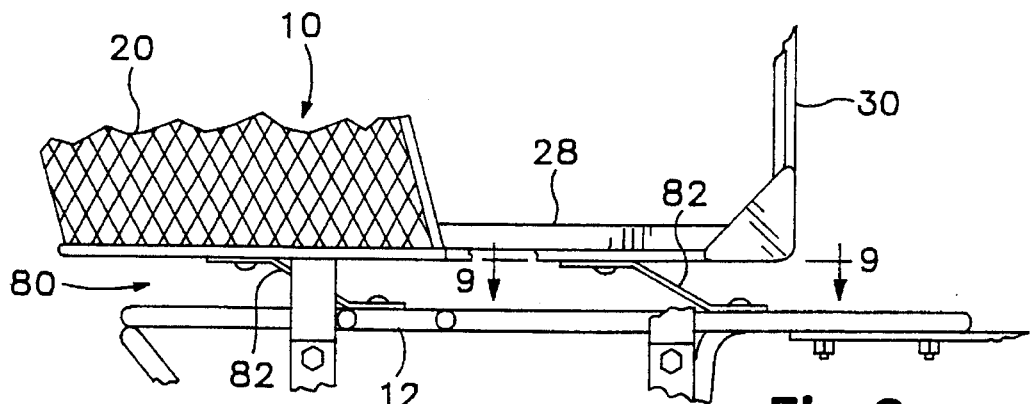
FIG. 8 is a partial side elevational view of a carrier of the present invention having a leaf spring suspension.
Figure 9:
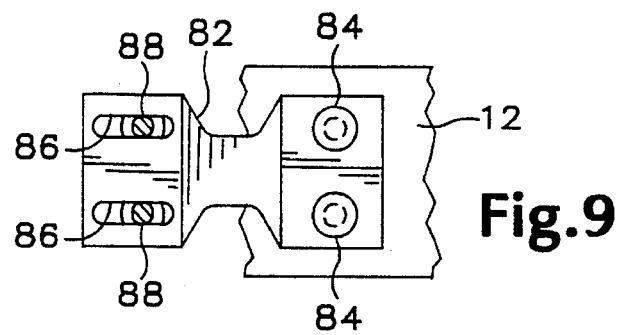
FIG. 9 is a detail plan view of a leaf spring as viewed along line 9—9 of FIG. 8.

Preferably, the carrier also includes a suspension system 80 to reduce impacts from road bumps from reaching a child in the carrier. In one preferred embodiment, shown in FIG. 8, the suspension system 80 comprises a plurality of leaf springs 82 having one end fixedly mounted to the frame 12 and one end mounted to the base plate 28 of the carrier 10. As can best be seen in FIG. 9, the spring 82 is connected to the frame 12 with mechanical fasteners 84, such as bolts or rivets. The leaf spring 82 is also provided with slotted connection points 86 to receive mechanical fasteners 88 for connection to the base plate 28. The slots 86 permit the base plate to be adjustably mounted along the spring 82 so as to provide a greater or lesser spring constant that is proportional to the moment arm between the fasteners 88 and the fasteners 84. For example, a heavier child would require a stiffer spring constant, thus requiring that the fasteners 88 be as close as possible to the fasteners 84. Alternatively, a lighter child would prefer a lower spring constant, which would require that the fasteners 88 be located as far as possible from the fasteners 84.

Figure 10:
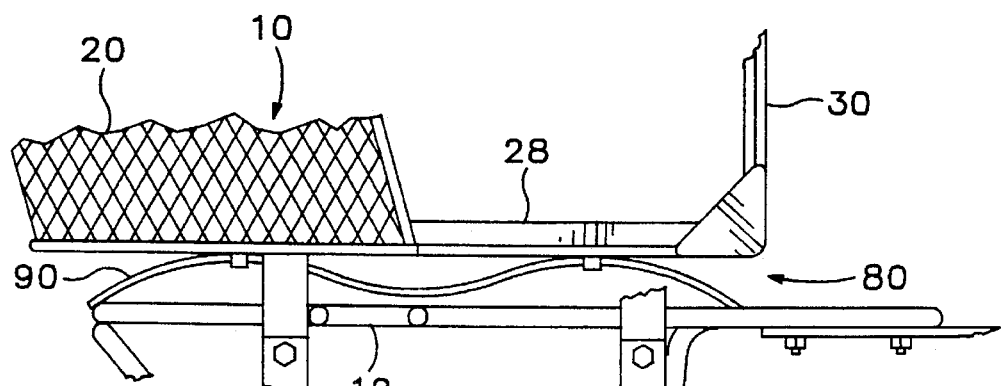
FIG. 10 is a partial side elevational view of a carrier of the present invention having a ribbon spring suspension.
Figure 11:
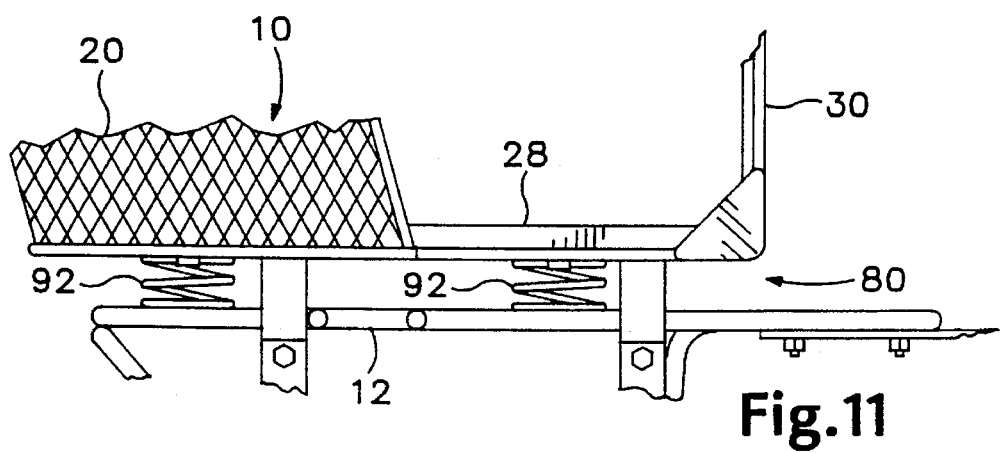
FIG. 11 is a partial side elevational view of a carrier of the present invention having a helical spring suspension.

Alternative embodiments of a suspension system 80 are shown in FIGS. 10 and 11. In FIG. 10, a convolute ribbon 90 of an elastic material, such as steel or plastic, is placed between the bottom plate 28 of the carrier and the frame 12. As road impacts are communicated through the frame 12 and resisted by the inertial resistance of the mass of a child in the carrier 10, the ribbon 90 will deform, thereby providing a suspension function.

In FIG. 11, the suspension system 80 comprises a plurality of helical springs 92 that are fixedly located between the bottom plate 28 and the frame 12. Alternatively, it may be advantageous to provide some combination of spring elements, such as the leaf spring 82 in combination with the helical spring 92. Alternatively, other means of suspension could include the placement of a resilient foam material between the bottom plate 28 and the frame 12, or the use of other resilient material, such as a honeycomb steel plastic structure, located between the bottom plate 28 and the frame 12.

Numerous characteristics and advantages of the invention have been set forth in the foregoing description, together with details of the structure and function of the invention. The novel features hereof are pointed out in the appended claims. The disclosure is illustrative only, and changes may be made in detail, especially in matters of shape, size, direction of rotation and arrangement of parts within the principle of the invention to the full extent indicated by the broad general meaning of the terms in the claims.

I claim:

1. A carrier for mounting onto a bicycle, comprising:
   (a) a backrest having a rear panel and contiguous side panels;
   (b) a bottom panel;
   (c) two footrest supports fixedly connected to the bottom panel along opposing lateral sides thereof, the supports including a leg guard portion for preventing a child's leg from contacting a rear wheel of the bicycle and wherein the leg guard portion is fixedly located relative to the backrest and bottom panel and further including footrests adjustably connected to the supports; and
   (d) a convertible element pivotally attached to a portion of the carrier, the convertible element including side elements, wherein the convertible element has a first position proximate the backrest, thereby defining two leg openings substantially aligned with the footrests, and a second position wherein the side elements block the leg openings.

2. The carrier of claim 1 further including a front panel and wherein the second position of the convertible element is proximate the front panel.

3. The carrier of claim 1 wherein the backrest is fixedly connected to the bottom panel, and the convertible element is pivotally attached to the bottom panel.

4. A bicycle having the carrier of claim 1 connected to a rack mounted on the bicycle and wherein the footrest supports are located on opposed sides of a rear wheel of the bicycle.

5. The carrier of claim 1 further including a front panel and wherein the backrest is fixedly attached to the bottom panel, the convertible element is pivotally attached to the bottom panel, and the first position of the convertible element is proximate the backrest and the second position is proximate the front panel.

6. The carrier of claim 1 further including at least one shock-absorbing suspension element attached to the carrier to reduce impact loads on cargo in the carrier due to road shocks on the bicycle.

7. A carrier for mounting onto a bicycle, comprising a bottom panel, a front panel connected to the bottom panel, a backrest connected to the bottom panel and having a back panel and at least two side panels, a convertible element that is pivotally attached to the bottom panel and having a first position that allows the carrier to accommodate a child and a second position to accommodate cargo, and a depending leg element having a leg guard and a footrest that is adjustably connected to the leg element wherein the footrest includes a toe abutment and a heel abutment to assist with maintaining a child's foot within the footrest.

8. A carrier for mounting onto a bicycle, comprising a bottom panel, a front panel connected to the bottom panel, a backrest connected to the bottom panel and having a back panel and at least two side panels, a convertible element that is pivotally attached to the bottom panel and having a first position that allows the carrier to accommodate a child and a second position to accommodate cargo, and a depending leg element having a leg guard and a footrest that is adjustably connected to the leg element wherein the footrest includes a toe abutment and a heel abutment to assist with maintaining a child's foot within the footrest further comprising a cushion hingedly connected to the convertible element and configurable into a first configuration proximate the back panel and the bottom panel when the convertible element is in the first position and configurable into a second configuration proximate the front panel and bottom panel when the convertible element is in the second position.

9. A carrier system for mounting over a wheel of a bicycle, comprising:
   (a) a rack having mounting points for connection to a frame of the bicycle;
   (b) a panel structure having a rear panel, a plurality of side panels, a bottom panel and a front panel, the panel structure being connected to the rack;
   (c) two leg elements depending from opposite lateral sides of the panel structure, each leg element having an adjustably connected footrest; and
   (d) a convertible element hingedly connected to the panel structure and convertible between a first position proximate the rear panel and a second position proximate the front panel wherein, the carrier system is configured as a child carrier defining leg openings when the convertible structure is in the first position and a cargo carrier having a cargo area substantially corralled by the panel element and the convertible element when the convertible element is in the second position.

10. The carrier of claim 9 wherein each leg element is fixedly located relative to the panel structure and comprises a leg guard portion fixedly attached to the panel structure and a depending footrest adjustably coupled to the leg guard portion.

11. The carrier of claim 9 further comprising adjustable mounts for mounting the panel element to the rack for adjusting the location of the panel element relative to an axle of a wheel of the bicycle.

12. The carrier of claim 9 further comprising at least one shock-absorbing suspension element located between the panel structure and the rack for cushioning the ride of a person in the carrier.

13. The carrier of claim 10 wherein the leg guard comprises a planar element to block a child's leg from contacting the bicycle wheel, and the footrest comprises a frame that defines a toe abutment and a heel abutment to assist with maintaining the child's foot within the footrest.

\* \* \* \* \*